United States Patent [19]

Glaze

[11] 4,373,744
[45] Feb. 15, 1983

[54] SUSPENSION CONTROL SYSTEM FOR A ROAD VEHICLE

[75] Inventor: Stanley G. Glaze, Brierley Hill, England

[73] Assignee: Lucas Industries Limited, Birmingham, England

[21] Appl. No.: 221,707

[22] Filed: Dec. 31, 1980

[30] Foreign Application Priority Data

Jan. 23, 1980 [GB] United Kingdom ............... 8002317

[51] Int. Cl.³ ............................................. B60G 11/26
[52] U.S. Cl. ................................ 280/707; 180/197; 267/64.28
[58] Field of Search ............ 280/705, 707, 708, 714; 180/197, 282; 267/64.28

[56] References Cited

U.S. PATENT DOCUMENTS

| | | | |
|---|---|---|---|
| 3,124,368 | 3/1964 | Corley | 280/707 |
| 3,995,883 | 12/1976 | Glaze | 280/707 |
| 4,065,154 | 12/1977 | Glaze | 280/707 |
| 4,079,963 | 3/1978 | Siorek | 280/705 |
| 4,156,536 | 5/1979 | Brandstadter | 280/705 |

Primary Examiner—Joseph F. Peters, Jr.
Assistant Examiner—John A. Carroll
Attorney, Agent, or Firm—Andrus, Sceales, Starke & Sawall

[57] ABSTRACT

A control system for a hydraulic suspension on a road vehicle comprises a common hydraulic connection for the suspensions of the wheels in a group, the vehicle being supported on a plurality of such wheel groups. Each said wheel group has a control valve for regulating fluid flow between its common hydraulic connection and a pressure source. The system includes means for generating first electrical signals corresponding to the vertical accelerations of the respective groups, means responsive to the first signals for generating second signals corresponding to the calculated vertical displacements of the respective wheel groups as a result of their vertical accelerations, means for generating third electrical signals corresponding to measured vertical displacements of the wheel groups, and means, responsive to differences between corresponding ones of the second and third signals for operating the respective control valves.

8 Claims, 13 Drawing Figures

SUSPENSION CONTROL SYSTEM FOR A ROAD VEHICLE

This invention relates to a suspension control system for a road vehicle.

In hydraulic suspension systems for road vehicles it is known to provide that hydraulic fluid is supplied under pressure, or released from, the suspension system to adjust the clearance of the suspended vehicle body above the ground. It is required to provide a suspension system in which a predetermined level of ground clearance is maintained substantially constant, and it has previously been proposed to effect this by providing an automatic levelling arrangement which is responsive to variations in the distances of the axes of the vehicle wheels from the vehicle body. A disadvantage of such an arrangement is that vertical wheel movements due to irregular ground are opposed by the levelling system, and this results in high work load on the pressurizing systems for the hydraulic fluid supply, as well as a stiff and uncomfortable riding characteristic of the vehicle body.

Attempts have been made to reduce the effects of vertical wheel movement on ground clearance by providing that the levelling arrangement is responsive only to input frequencies which are lower than the characteristic frequencies of the wheel suspensions. It is a disadvantage of this approach that the levelling system then becomes insensitive to pitch or roll of the vehicle body due, for example, to braking acceleration or external lateral forces.

It is an object of the present invention to provide a system for controlling a hydraulic suspension so as to maintain a substantially constant ground clearance, and in which the foregoing disadvantage are overcome.

According to the invention there is provided a control system for a hydraulic suspension arrangement on a road vehicle which has a plurality of wheel groups, each said wheel group including one or more wheels each of which have a hydraulic suspension, the suspensions in each said group having a common hydraulic connection, the said control system comprising means for generating first electrical signals corresponding to the vertical accelerations of the respective wheel groups, means responsive to said first electrical signals for generating second electrical signals corresponding to the calculated vertical displacements of the respective wheel groups resulting from said accelerations, means for generating third electrical signals corresponding to measured vertical displacement of the respective wheel groups, and means, responsive to differences between corresponding ones of said second and third signals, for controlling fluid flow between a source and the hydraulic suspensions of the respective wheel groups.

A preferred embodiment includes means responsive to said first electrical signals for generating fourth electrical signals corresponding to calculated values of accelerations of said vehicle body resulting from said vertical accelerations of the wheel groups, and means for modifying said third electrical signals in accordance with the magnitudes of said fourth signals.

An embodiment of the invention will now be described by way of example only and with reference to the accompanying drawings in which.

Figure 1:
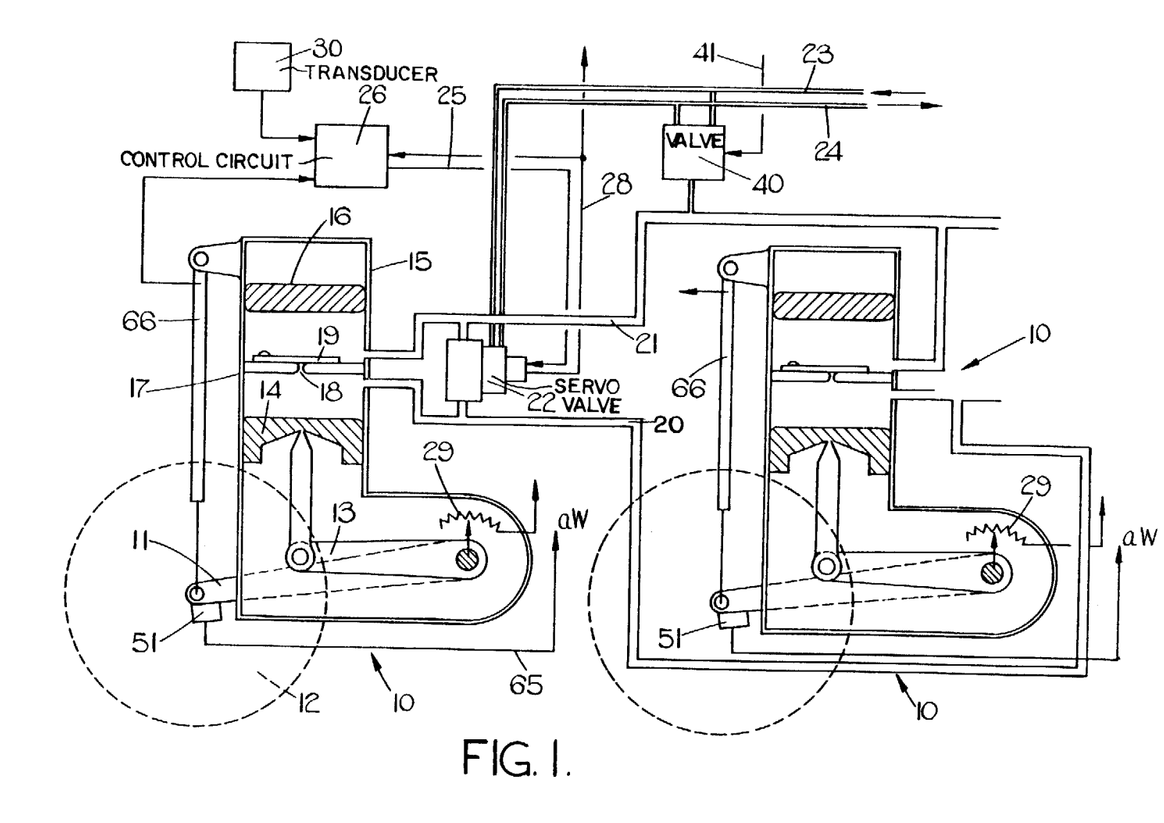
FIG. 1 is a diagram of a hydraulic suspension for a group of vehicle wheels.
Figure 9:
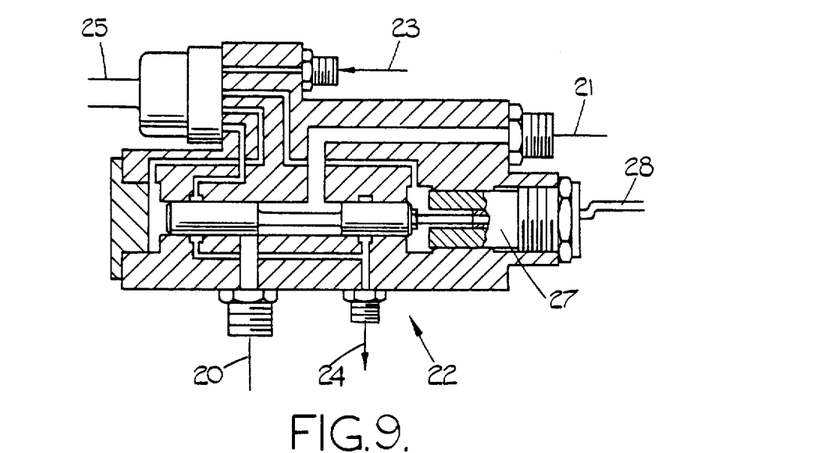
FIG. 9 shows details of a control valve forming part of the suspension of FIG. 1.

Referring first to FIG. 1, two hydraulic suspension devices 10 are secured to a vehicle body and include pivotally mounted arms 11 on the free ends of which vehicle wheels indicated at 12, are carried. Secured to each arm 11 for pivotal movement therewith is a lever 13 which coacts with a piston 14 slidable in a cylinder 15. Also slidable within the cylinder 15 is a free piston 16 which is separated from the piston 14 by a wall 17 having a restricted orifice 18. The orifice 18 is closeable by a valve 19 so that hydraulic fluid in the cylinder 15 between the pistons 14 and 16 can flow through the orifice 18 in an upward direction only. The spaces between the piston 14 and walls 17 in each of the devices 10 are interconnected by a line 20, and the spaces between the walls 17 and piston 16 are interconnected by a line 21. An electro-hydraulic servo valve 22, shown in more detail in FIG. 9, is operable by the pressures in hydraulic supply and return lines 23, 24 and is responsive to electrical signals on a line 25 from a control circuit 26. The valve 22 includes a position transducer 27 (FIG. 9) for providing valve position signals on lines 28 to the circuit 26. The circuit 26 is of the type disclosed in British Pat. No. 1485003 and is responsive to signals from transducers 29, indicating the positions of the wheels 12 relative to the vehicle body, to signals from acceleration transducers 30 on the vehicle body adjacent the respective wheels, and provides signals on the line 25 to control the valve 22, and hence the damping force of the suspension devices 10, so as to cause the accelerations of the various points on the vehicle body to be a desired value of a function of the displacement signal from the transducers 29.

The suspension shown in FIG. 1 also includes an electro-hydraulic valve 40 which is operable in response to signals on a line 41 to connect the line 21 either to the hydraulic supply line 23 or the return line 24 and by thus varying the amount of hydraulic fluid within the cylinders 15 between the pistons 14, 16, to vary the height of the vehicle body above the ground. The signals on line 41 are derived from a control circuit later to be described in detail. It is to be understood that the suspension shown in FIG. 1 could include only one of the devices 10, or could include more than the two devices 10 shown, for which purpose the lines 20, 21 are shown open ended.

Figure 2:
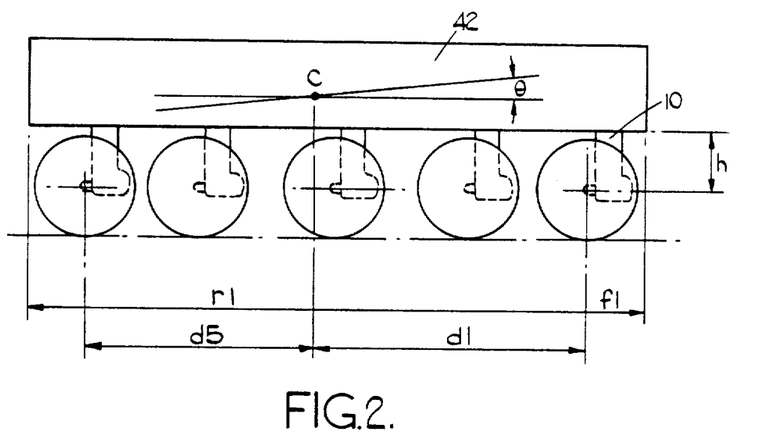
FIG. 2 shows, diagrammatically, a side elevation of a vehicle.
Figure 3:
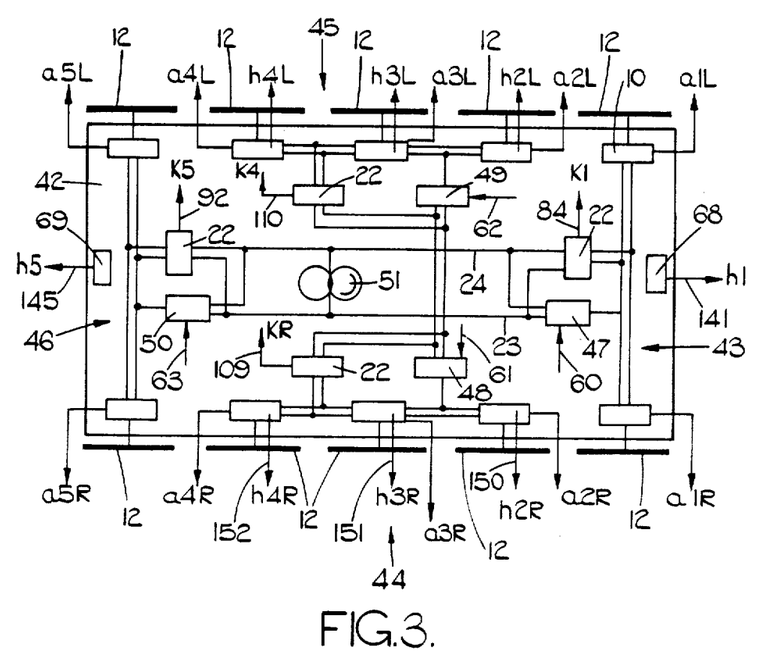
FIG. 3 is a diagrammatic plan of the vehicle of FIG. 2.

FIGS. 2 and 3 show a vehicle having a body 42 and ten wheels, five of these wheels 1R, 2R, 3R, 4R and 5R being on the right hand side of the vehicle, and the corresponding wheels 1L to 5L being on the left of the vehicle. Each of the wheels has an associated suspension device 10, and the devices 10 of the wheels 1R and 1L are interconnected as indicated in FIG. 1 to provide a first wheel group 43. The suspension devices of wheel 2R to 4R are similarly interconnected to provide a second wheel group 44, the devices 10 of wheels 2L to 4L are interconnected to provide a third wheel group 45, and the devices 10 of wheels 5R and 5L are interconnected to provide a fourth wheel group 46. The suspension systems of each of the wheel groups 43, 44, 45, 46 has a damping control valve 22. The wheel groups 43, 44, 45, 46 also have respective valves 47, 48, 49, 50 corresponding to the valve 40 described with reference to FIG. 1.

As indicated in FIG. 1 the arm 11 of each suspension device 10 carries an accelerometer 51 which can provide, on a line 65, a signal corresponding to the absolute vertical acceleration aW of the associated wheel 12. There may also be provided a velocity transducer 66 responsive to movement of the arm 11 for providing, on a line 67 a signal corresponding to the relative velocity between the axis of a wheel 12 and a location on the vehicle body. In fact, the axes of the wheels 1R and 1L are linked together so that a single displacement transducer 68 (FIG. 3) provides a signal h1 corresponding to the relative position of the axes of these wheels from an adjacent part of the body. Wheels 5R and 5L are similarly linked so that a transducer 69 provides a signal h5 corresponding to the relative position of the axes of these wheels from an adjacent part of the body. Separate displacement transducers 29 are mounted on each of the suspension devices 10 of the wheels 2R, 3R, 4R and to 2L, 3L, 4L, the mean of the signals from these six transducers being obtained in a manner later to be described.

Figure 4:
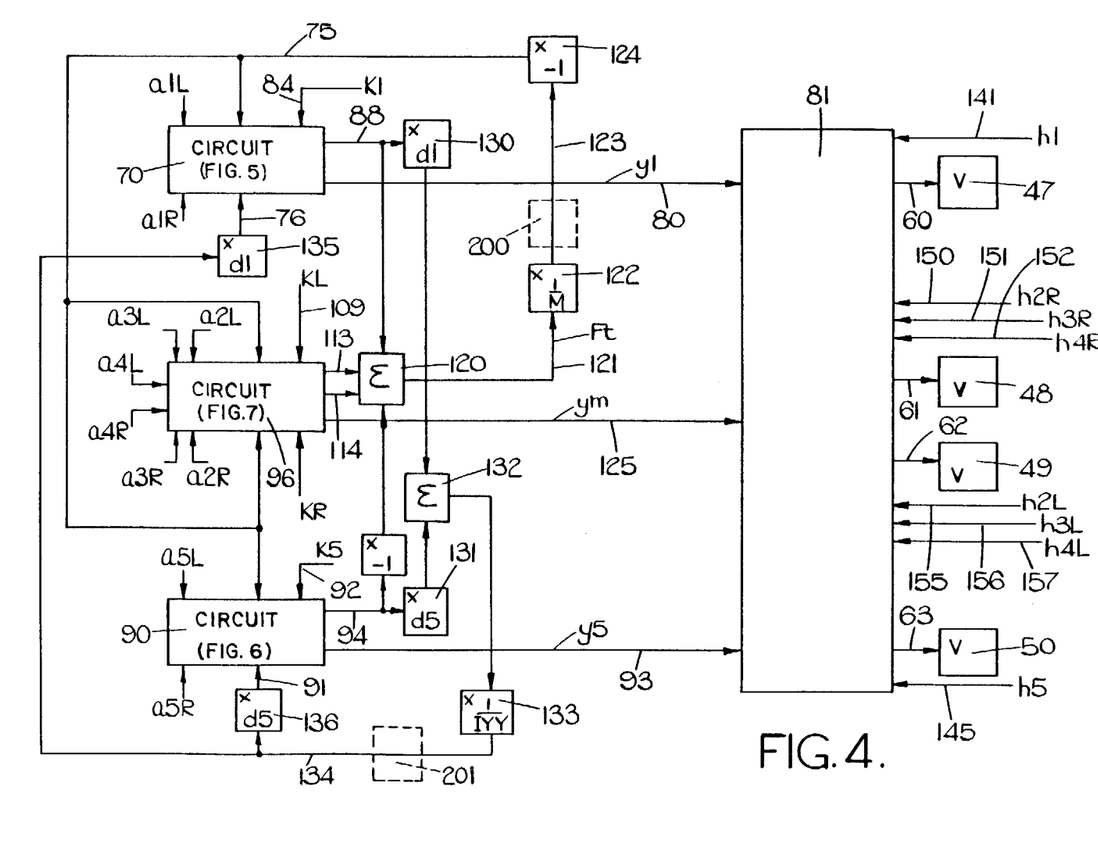
FIG. 4 is a diagram of a control system for the suspension of the vehicle of FIGS. 2 and 3, FIGS. 5, 6, 7 and 8 show parts of the circuit of FIG. 4.
Figure 5:
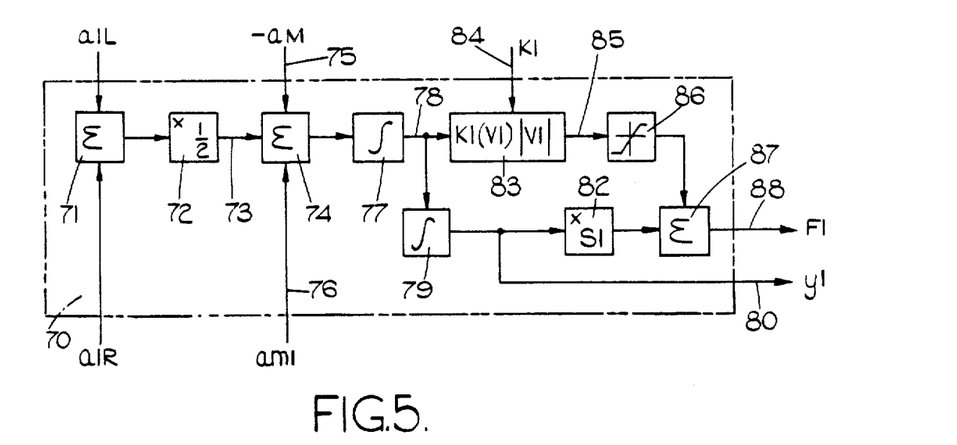

The control circuit shown in FIGS. 4 includes a circuit 70 which is shown in more detail in FIG. 5 and which is responsive to the absolute acceleration signals a1R and a1L from the suspension devices of the respective wheels 1R, 1L. The circuit 70 includes a summing circuit 71 for these signals and a circuit 72 for halving the sum so obtained to provide, on a line 73 a mean of the two acceleration signals. A summing circuit 74 is responsive to the acceleration signal on line 73 and to acceleration signals on lines 75, 76. The signal aM on line 75 corresponds to a calculated value of the vertical acceleration of the centre of mass of the vehicle body, and the signal am1 corresponds to a calculated value of the vertical acceleration of a part of the vehicle body adjacent the axes of the wheels 1R, 1L. The manner in which the foregoing calculated values of acceleration are derived will be described hereafter.

The acceleration sum from the circuit 74 corresponds to a calculated value of the acceleration of the wheel group 43 relative to an adjacent part of the body 42, and is applied to an integrating circuit 77 to provide, on a line 78, a signal V1 corresponding to a calculated velocity of the common axes of the wheels 1R, 1L relative to an adjacent part of the vehicle body. The signal on line 78 is integrated in a further circuit 79 to provide a signal y1 corresponding to a calculated value of the positions of the axes of the wheels 1R, 1L from the adjacent part of the vehicle body. The signal y1 is passed on a line 80 to a comparator circuit 81, shown in more detail in FIG. 8. The signal y1 is also passed to a circuit 82 in which it is multiplied by a value S1 corresponding to an estimated value of the stiffness of the combined suspension units 10 of the wheels 1R, 1L. The velocity signal V1 on line 78 is also passed to a circuit 83 in which it is multiplied by a value k1 corresponding to the effective flow area of the suspension damping and supplied on a line 84 from the linear transducer 27 (see FIG. 9) in the valve 22 associated with the wheel group 43 (wheels 1R, 1L). The signal V1 may be either positive or negative, dependent on the measured magnitudes, of the signals a1L, a1R, and the calculated values of aM and am1. The signal V1 is therefore multiplied, in a circuit 83 by its own modulus to provide, on a line 85, a signal corresponding to the product of the flow area of the valve 22 and the square of the flow velocity therethrough, and hence the force resulting from the pressure difference on opposite sides of the wall 17 in the associated suspension units 10. The force signal on line 85 is applied through a limiting circuit 86 to one input of a summing circuit 87 whose other input is provided by the output of the circuit 82. The output signal F1 on a line 88 from the circuit 87 corresponds to the calculated value of the total force applied by the wheel group 43 to the vehicle body and resulting both from hydraulic damping and suspension stiffness.

Figure 6:
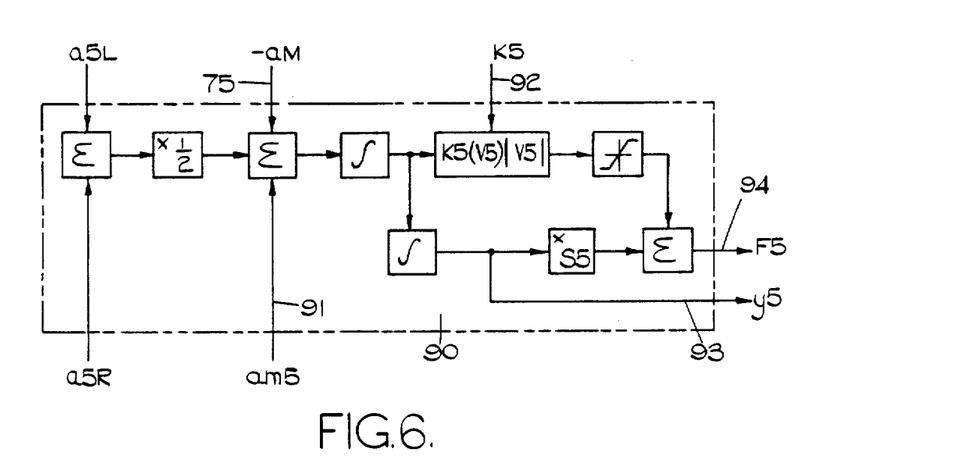

A circuit 90, identical with the circuit 70, is shown in more detail in FIG. 6 and is responsive to the measured vertical acceleration a5R and a5L of the wheels of the group 46. The circuit 90 is also responsive to the signal −aM on line 75 and to a signal am5 on a line 91, the signal am5 corresponding to the calculated vertical acceleration of a portion of the vehicle body adjacent the wheel group 46, and being derived in a manner later to be described. The circuit 90 is also responsive to a signal k5 on a line 92, the signal k5 being obtained from the valve 22 for the wheel group 46 and corresponding to the effective flow area of this valve. The circuit 90 provides, on a line 93 a signal y5 corresponding to a calculated value of the distance of the axes of wheels 5R, 5L from an adjacent part of the vehicle body. The circuit 90 also provides, on a line 94, a signal F5 corresponding to the calculated force exerted on the vehicle body by the suspension devices of the wheel group 46.

Figure 7:
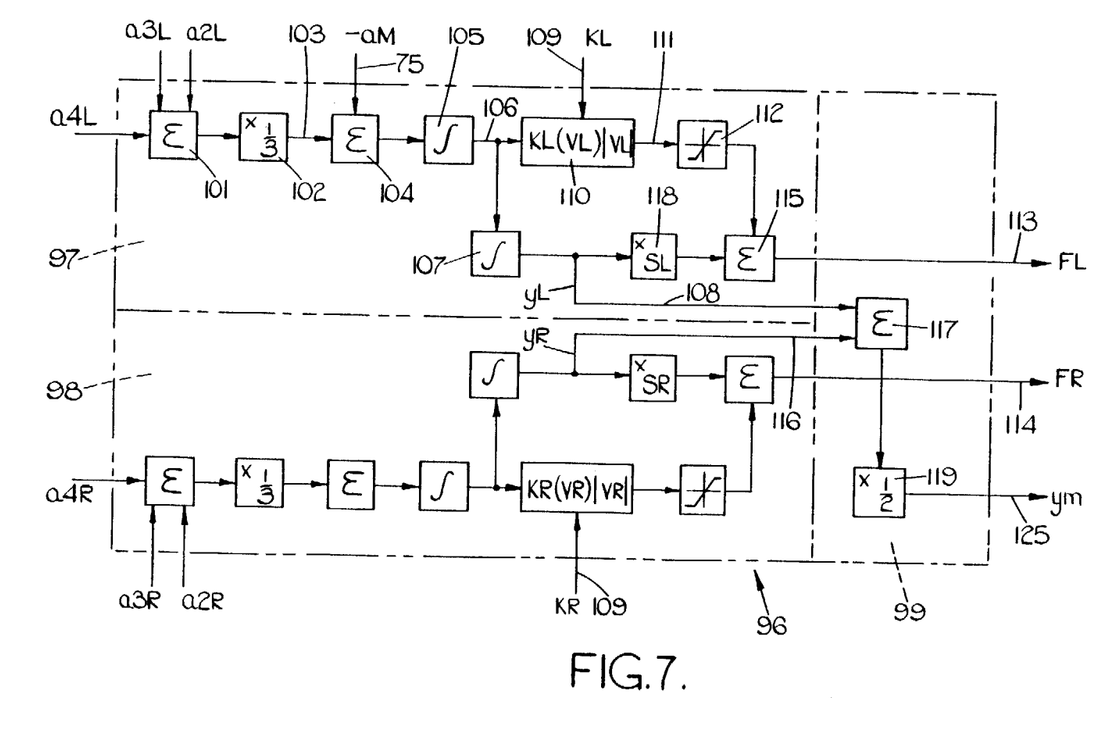

A further circuit 96 is shown in detail in FIG. 7 and comprises three sub-circuits 97, 98, 99. The circuit 97 includes a summing circuit 101 which is responsive to the measured vertical accelerations a2L, a3L and a4L of the wheels in the group 45. A circuit 102 divides the summed output of the circuit 101 by six and thereby provides, on a line 103 a signal corresponding to the mean of the vertical acceleration aL of the wheels in the groups 45. The signal on line 103 is summed with the signal −aM on line 75 by means of a circuit 104. The output of the circuit 104 is integrated in a circuit 105 to provide, on a line 106 a signal VL corresponding to a calculated value of the mean velocities of the wheels in the group 45 relative to the centre of mass of the vehicle body. The signal on line 106 is integrated in a circuit 107 to provide a signal yL corresponding to a calculated value of the mean distance of the wheels in the group 45 from an adjacent part of the vehicle body. The signal yL is applied on a line 108 to the circuit 99 and is also multiplied, in a circuit 118, by a value SL corresponding to a calculated value of the mean stiffness of the suspension devices of the wheel group 45.

The transducer 27 (FIG. 9) in the valve 22 of the wheel group 45 provides an output signal kL corresponding to the measured effective orifice size of this valve. The signal kL is supplied on a line 109 to a circuit 110 within the circuit 97. The circuit 110 provides, on a line 111, an output signal which is the product of the signal kL the calculated velocity signal VL and the modulus of the signal VL, the signal on line 111 thus corresponding to the force due to hydraulic pressure applied to the body 42 by the suspensions of the wheel group 45. The signal on line 111 is supplied through a limiting circuit 112 to a summing circuit 115 whose other input is supplied by the output of the circuit 118. The output of the circuit 115 is supplied on a line 113 and is a signal FL corresponding to a calculated value of the total vertical force applied to the vehicle body by the suspensions of the wheel group 45.

The circuit 98 is substantially identical with the circuit 97 and is responsive to the measured vertical accelerations a2R, a3R, and a4R of the wheels in the group 44, and also to a signal kR from the transducer 27 of the valve 22 associated with the wheel group 44. The circuit 98 provides, on a line 114, a signal FR corresponding to a calculated value of the total vertical force applied to the vehicle body 42 by the wheel group 44. The circuit 98 also provides a signal yR on a line 116, the signal yR corresponding to a calculated value of the mean distance of the wheels of the group 44 from an adjacent part of the vehicle body 42.

The yL and yR signals on lines 108, 116 are summed by a circuit 117 in the circuit 99, the output of the circuit 117 being halved by a circuit 119 to provide, on a line 125, a signal ym corresponding to a calculated value of the mean distance of the wheels in the groups 44, 45 from adjacent parts of the vehicle body 42.

The signals F1, FL, FR and F5 on lines 88, 113, 114, 94 respectively, are summed in a circuit 120 (FIG. 4) to provide, on a line 121 a signal Ft corresponding to calculated value of the total vertical force applied by all of the suspension devices 10 to the vehicle body 42. The signal Ft is divided, by means of a circuit 122, by the mass M of the vehicle body to provide, on a line 123 a signal aM corresponding to the vertical acceleration of the centre of mass of the vehicle body. The signal on line 123 is multiplied by minus unity in a circuit 124 so that the resultant signal on line 75 is substracted in the respective circuits 70, 90, 96.

The calculated force signal F1 on line 88 is multiplied in a circuit 130 by a value d1 (FIG. 2) corresponding to the distances of the centres of the wheels 1R, 1L from a vertical plane which includes the centre of mass C of the vehicle body 42 and which is normal to the fore and aft axis of the vehicle. The calculated force F5 on line 94 is multiplied in a circuit 131 by a value d5 corresponding to the distances of the axes of the wheels 5R, 5L from the aforesaid vertical plane. The distance d1 is assumed to be positive and the distance d5 to be negative. The outputs of the circuits 130, 131 are summed in a circuit 132 and represent the couple applied to the vehicle body 42 about an axis yy through the centre of mass C perpendicular to the fore and aft axis of the body 42. The output from circuit 132 is divided, in a circuit 133 by the moment of insertia Iyy about the aforesaid yy axis and thereby provides, on a line 134, a signal corresponding to the angular acceleration of the vehicle body about the axis yy. The signal on line 134 is multiplied in a circuit 135 by the value d1 to provide, on the line 76, the linear acceleration am1 of the part of the vehicle body at distance d1 from the centre of mass C, and arising from movement of the vehicle body about the axis yy. The angular acceleration signal on line 134 is also multiplied in a circuit 136 by the value d5 to provide, on the line 91, a signal corresponding to the calculated absolute vertical acceleration am5 of the portion of the vehicle body at distance d5 from the centre of mass C, resulting from the aforesaid movement about axis yy.

The signals y1, ym and y5 on the respective lines 80, 125, 93 thus represent the respective mean values of the calculated distances from adjacent points on the vehicle body of the axes of the wheels in the group 43, the groups 44 and 45 and the group 46. The signals y1, ym, y5 thus also provide calculated values for the heights of the respective points on the vehicle body above the ground, based on measured vertical accelerations of the wheels, but taking no account of accelerations imparted to the vehicle body 42 as a result of braking, acceleration, or lateral or vertical loads, or of changes in vehicle body height arising from hydraulic leakage or temperature changes.

Figure 8:
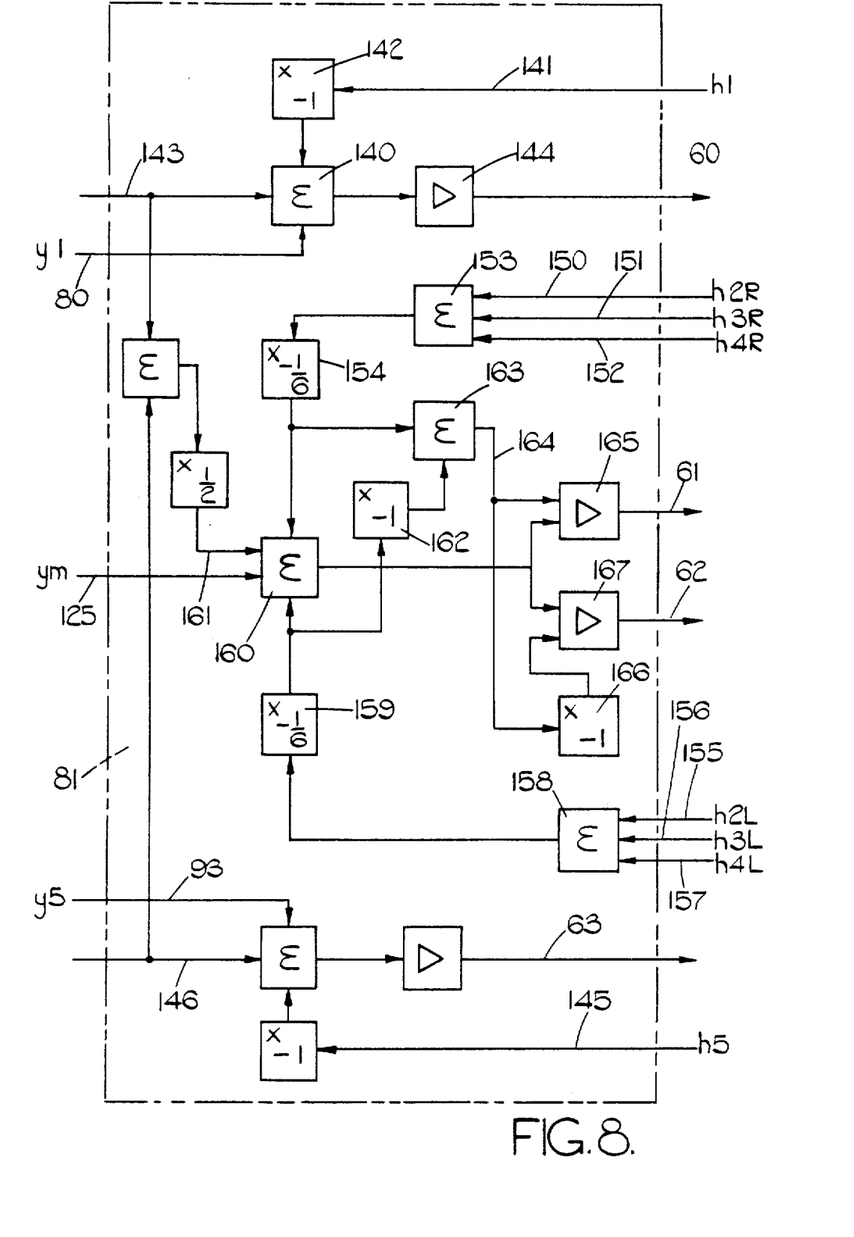

The comparator circuit 81 to which the signals y1, ym, and y5 are supplied is shown in more detail in FIG. 8. The signal y1 on line 80 is applied to a summing circuit 140. Since the wheels 1R, 1L have common axes, as above described the single displacement transducer 68 (FIG. 3) can provide a signal h1 of the measured distance of the axes of these wheels from an adjacent point on the vehicle body, and this signal is applied on a line 141 to a circuit 142 which multiplies the h1 signal by minus unity. The output from circuit 142 provides a further input to the summing circuit 140. The circuit 140 is responsive to a third signal on a line 143, this last signal being manually adjustable to provide an indication of a desired height above the ground of that part of the vehicle body. The output signal from circuit 140 thus corresponds to a difference between calculated and actual values of the ground clearance of the aforesaid point on the vehicle body, as modified by the signal on line 143. The output signal from circuit 140 is passed through an amplifier 144 and thence on the lines 60 to the valve 47 to control admission or porting of high pressure fluid from the suspension arrangement of the wheel group 43.

The signal y5 is similarly summed with the negative value of a measured quantity h5 of the distance between the axes of the wheels in the group 46 from an adjacent point on the vehicle body, the resultant amplified error signal on the line 63 to the valve 50 of the wheel group 46 being modified by a manually adjustable signal on a line 146.

Signals h2R, h3R, h4R from the transducers 66 in the suspension devices 10 of the wheels forming the group 44 are supplied on respective lines 150, 151, 152 to a summing circuit 153 whose output is multiplied by $-1/6$ in a circuit 154. Signals h2L, h3L, and h4L from the corresponding transducers in the wheel group 45 are supplied on respective lines 155, 156, 157 to a summing circuit 158 whose output is multiplied by $-1/6$ in a circuit 159. The outputs of the circuits 154, 159 are summed by a circuit 160 to provide a mean of the distances h of the wheels in the groups 44, 45 from adjacent points on the vehicle body. The summing circuit 160 is also responsive to the calculated value ym on line 108 and to a signal on a line 161, this last signal corresponding to a mean of the values applied manually to the lines 143 and 146. The output signal from the circuit 160 thus corresponds to a difference between the calculated and measured values of the mean distances of the wheels in the groups 44, 45 from an adjacent point on the vehicle body 42, as modified by a manual signal on line 161. The output signal from circuit 159 is multiplied by minus unity in a circuit 162 and the output from circuit 162 is summed with that from circuit 154 by means of a circuit 163 to provide, on a line 164 a signal corresponding to a difference between the measured distances of the wheel groups 44, 45 from respective adjacent parts of the vehicle body, and thereby providing an indication of a tendency of the vehicle body to roll about its longitudinal axis. The circuit 162 has the effect that the sign of the signal on line 164 is indicative of the direction of roll. The output from the circuit 160 is summed with the signal on line 164 in an amplifier 165 and applied on the line 61 to the levelling valve 48 of the wheel group 44. The signal on line 164 is also multiplied by minus unity in a circuit 166 whose output is applied to a summing amplifier 167. The other input of the amplifier 167 is provided by the output of circuit 160 and the output of amplifier 167 is applied on the line 62 to the levelling valve 49 of the wheel group 45. The signals on lines 61, 62 are thus modified in opposite senses by any "roll" signal on line 164, in a manner to correct roll.

Thus, with the manually adjustable signals on lines 143, 146 maintained constant, the levelling valves 47, 48, 49, 50 of the respective wheel groups 43, 44, 45, 46, are responsive to the differences between the calculated distances y and measured distances h of the wheels in these groups from corresponding parts of the vehicle body 42. In the absence of additional forces on the vehicle body the aforesaid differences may be expected to be very small, and the levelling valves will not be operated. The work load of the pump 51 (FIG. 3) will thus be a minimum in the absence of forces on the vehicle body other than those due to vertical movement of the wheels. The system nevertheless remains fully responsive to these other forces, by virtue of the h signals from the transducers 66 in the wheel suspensions.

Figure 10:
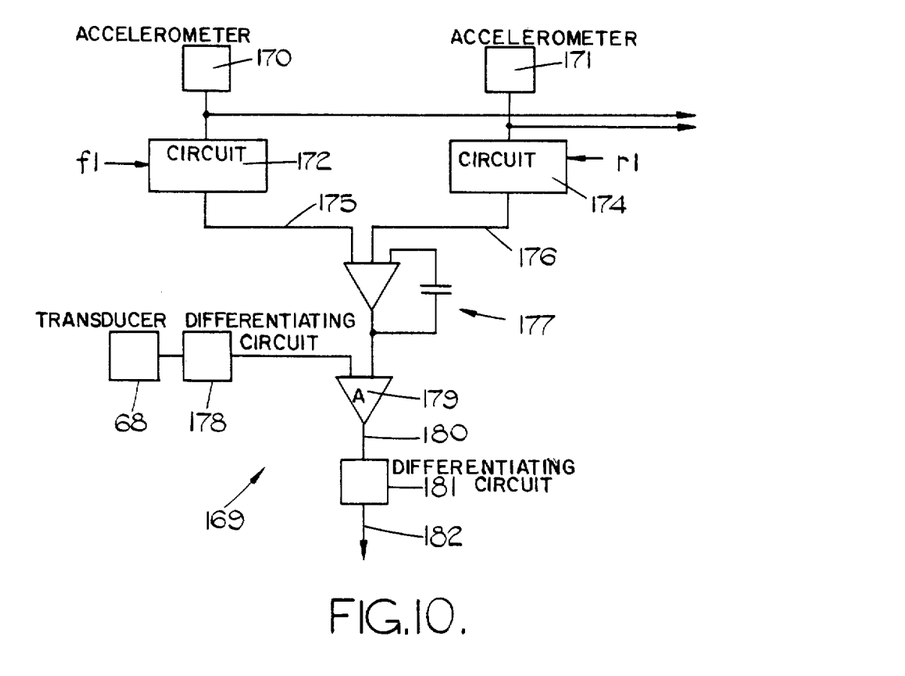
FIG. 10 is a modification of part of the circuit of FIG. 4.

In some vehicles it may be disadvantageous to provide the accelerometers 51 shown in FIG. 1, since these accelerometers will require flexible connections to the remainder of the system. FIG. 10 shows an alternative arrangement in which signals from the displacement transducers 66 the respective wheels may be used to calculate absolute vertical accelerations of the wheels. In the example described with reference to FIG. 10 the accelerations of the wheels 1R, 1L of the group 43 are calculated.

Accelerometers 170, 171 are mounted at the front and rear respectively of the vehicle body 42 to provide signals corresponding to measured values of the vertical acceleration of the body at these locations. A circuit 172 is responsive to the acceleration signal from the accelerometer 170 and also to a signal f1 (FIG. 2) corresponding to the distance of the wheel from the front of the vehicle body 42. A circuit 174 is responsive to the signal from accelerometer 171 and to a value r1 corresponding to the distance of the wheel from the rear of the vehicle body. Output signals from the circuits 172, 174 are applied on respective lines 175, 176 to an integrating circuit 177. The arrangement is such that the output of the circuit 177 is a signal corresponding to the absolute velocity of the vehicle body at a location thereon adjacent the wheel. The signal from the transducer 68 (FIG. 3) is differentiated in a circuit 178 and applied to a difference amplifier 179 together with the output of the integrating circuit 177. The output of the amplifier 179 on a line 180, corresponds to the absolute velocity of the wheel and is differentiated in a circuit 181 to provide, on a line 182, a signal corresponding to the absolute acceleration of the wheel. The signal on line 182 is applied to the circuit 70 of FIGS. 4 and 5, instead of the signals a1R and a1L.

Absolute accelerations for the remaining wheels may be derived in a similar manner and applied to the control circuit shown in FIG. 4.

In a further alternative arrangement there is provided an additional integrating circuit 200 (FIG. 4) so that the signal on line 123 corresponds to a calculated value VC of the absolute velocity of the centre of mass C of the vehicle body 42, resulting from the summed value of the suspension forces on line 121. This absolute velocity signal VC is multiplied by minus unity in the circuit 124 and applied on the line 75. This alternative arrangement also has an integrating circuit 201 (FIG. 4) so that the signal on line 134 corresponds to the calculated angular velocity of the vehicle body 42 about its axis yy. The signals on lines 76, 91 then correspond to the calculated absolute vertical velocities vm1, vm5 of the parts of the vehicle body at respective distances d1 and d5 from the centre of mass C, resulting from rotation about the axis yy.

Figure 11:
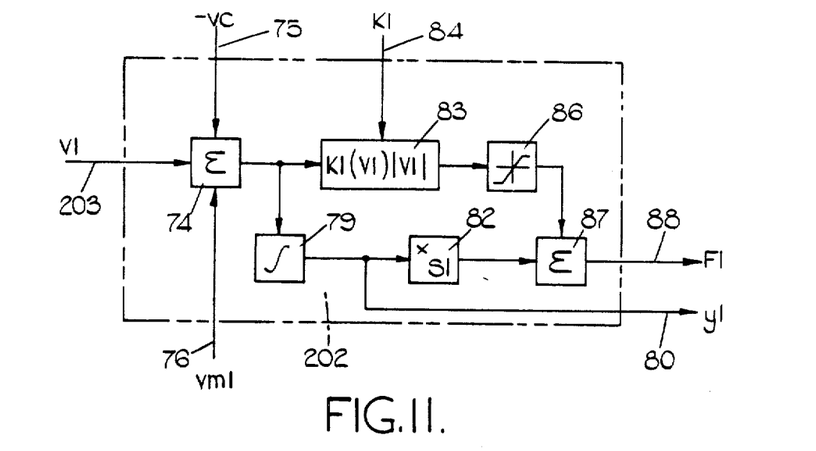
FIG. 11 is a modification of the circuit of FIG. 5, and FIGS. 12 and 13 indicate corresponding modifications of the circuits of FIGS. 6 and 7.

Circuit 202, shown in FIG. 11, is a modification of the circuit 70 of FIG. 5, corresponding items of these circuits being allocated identical reference numbers. The principal difference in the circuit 202 is that the circuits 71, 72 and 77 of the circuits 70 are omitted, and that the summing circuit 74 is responsive to the calculated absolute wheel velocity v1 on a line 203 which connects with the line 180 (FIG. 10) in the circuit associated with the wheel group 43. The summing circuit 74 is also responsive to the velocity signals −VC and vm1 on lines 75 and 76 respectively in the modified form of the circuit of FIG. 4. Circuit 202 provides a force signal F1 and displacement signal y1 on respective lines 88, 80 in a like manner to the circuit 70.

Figure 12:
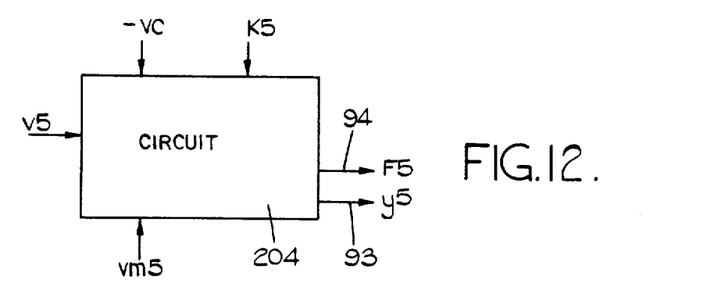
Figure 13:
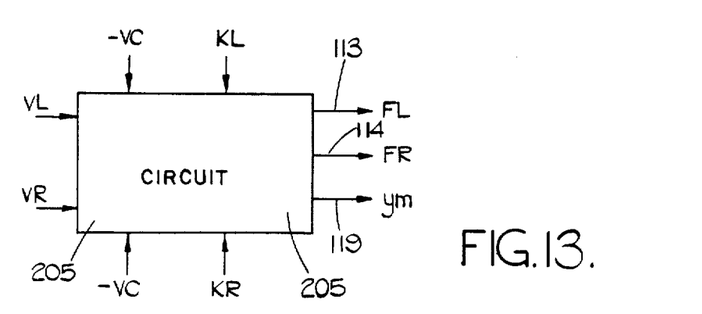

Circuits 204 and 205 are indicated in FIGS. 12 and 13 and are modified forms of the respective circuits 90 (FIG. 6) and 96 (FIG. 7). Circuit 204 is responsive to velocity signals v5, −VC and vm5 and to the signal k5 to provide a calculated displacement signal y5 and calculated force F5 on lines 93, 94 respectively.

Circuit 205 is responsive to absolute velocity signals vR and vL from the respective wheel groups 44, 45, to the velocity signal −VC and to signals kL and kR to provide force signals FL and FR on respective lines 113, 114, as well as the displacement signal ym on line 119.

I claim:

1. A control system for a hydraulic suspension arrangement on a road vehicle which has a plurality of wheel groups, each said wheel group including one or more wheels each of which has a hydraulic suspension, the suspensions in each said group having a common hydraulic connection, the said control system comprising means for generating first electrical signals corresponding to the vertical accelerations of the respective wheel groups, means responsive to said first electrical signals for generating second electrical signals corresponding to the calculated vertical displacements of the respective wheel groups resulting from said accelerations, means for generating third electrical signals corresponding to measured vertical displacement of the respective wheel groups, and means, responsive to differences between corresponding ones of said second and third signals, for controlling fluid flow between a source and the hydraulic suspensions of the respective wheel groups.

2. A control system as claimed in claim 1 which includes means responsive to said first electrical signals for generating fourth electrical signals corresponding to calculated values of accelerations of said vehicle body resulting from said vertical accelerations of the wheel groups, and means for modifying said second electrical signals in accordance with the magnitudes of said fourth signals.

3. A control system as claimed in claim 1 in which said means for controlling fluid flow comprises means for measuring the vertical displacements of said wheels, means responsive to said measured vertical displacements for generating signals corresponding to the mean displacements of each of the wheel groups, and means responsive to said second signals and to respective ones of said mean displacement signals for generating control signals, the hydraulic suspensions of each said wheel group including a second valve for controlling fluid between said source and said suspensions, said second valves being responsive to respective ones of said control signals.

4. A control system as claimed in claim 3 in which said means for controlling fluid flow includes means for generating first and second measured vertical displacement signals for respective left and right wheel groups on opposite sides of the vehicle, means for generating a signal corresponding to a difference between said first and second measured vertical displacement signals, and means responsive to said difference signal and to said second electrical signals for said left and right wheel groups, for generating said control signals to said second valves in the suspensions of said left and right wheel groups.

5. A control system for a hydraulic suspension arrangement on a road vehicle which has a plurality of wheel groups, each said wheel group including one or more wheels each of which has a hydraulic suspension, the suspensions in each said group having a common hydraulic connection, the said control system comprising means for generating first electrical signals corresponding to the vertical accelerations of the respective wheel groups, means responsive to said first electrical signals for generating second electrical signals corresponding to the calculated vertical displacements of the respective wheel groups resulting from said accelerations, means for generating third electrical signals corresponding to measured vertical displacements of the respective wheel groups, means responsive to differences between corresponding ones of said second and third signals for controlling fluid flow between a source and the hydraulic suspension of the respective wheel groups, means responsive to said first electrical signals for generating fourth electrical signals corresponding to calculated values of accelerations of said vehicle body resulting from said vertical acceleration of the wheel groups, and means for modifying said second electrical signals in accordance with the magnitudes of said fourth signal, said means for generating the fourth electrical signals comprising means for generating fifth signals corresponding to calculated values of the vertical forces applied by said wheel groups to said body, and means for dividing the sum of said fifth signals by a signal corresponding to the mass of said body.

6. A control system as claimed in claim 5 which includes means, responsive to the first signals from first and second wheel groups which are suspended adjacent the front and rear respectively of said body, for generating a sixth signal corresponding to a calculated value of the angular acceleration of said body in response to forces from said first and second wheel groups, and means for modifying the second electrical signals for said first and second wheel groups in accordance with said sixth signal.

7. A control system as claimed in claim 6 in which said means for generating the sixth signal comprises means for multiplying the fifth signals for said first and second wheel groups by values which correspond to the respective horizontal distances of these groups from the centre of mass of said body, means for summing the products of said multiplication, and means for dividing said sum by a value corresponding to the moment of inertia of said body about an axis which passes horizontally transversely through the centre of mass of the body.

8. A control system as claimed in claim 3 in which each suspension comprises first and second chambers between which liquid is displaced as a result of vertical movement of the wheel mounted on that suspension, each said wheel group including a first valve for regulating flow between the chambers of the suspensions in that group, and means for generating signals corresponding to the effective flow areas of the first valves, said means for generating the fifth signals comprising means for generating signals corresponding to the vertical velocities of the respective wheel groups relative to adjacent parts of the vehicle body, means responsive to said velocity signals and to said flow area signals for generating seventh signals corresponding to forces arising from differences in pressure between said chambers of the respective wheel groups, means responsive to said velocity signals for generating signals corresponding to the displacements of said wheel groups from said body, means for generating eighth signals corresponding to calculated products of said displacement signals and values representing the stiffness of the suspensions of the respective wheel groups, and means for summing said seventh and eighth signals associated with the respective wheel groups.

* * * * *